Dec. 1, 1936. T. W. HOWARD ET AL 2,062,811
PLOWSHARE WITH DETACHABLE POINT
Filed July 30, 1936
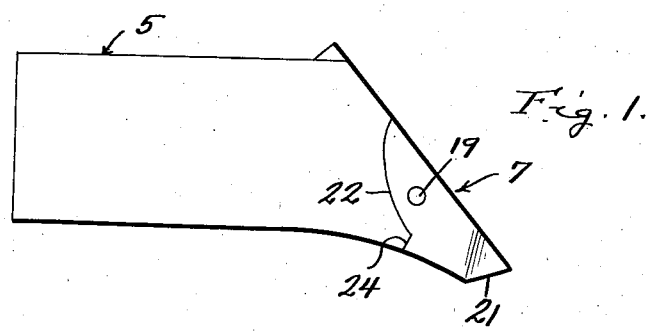
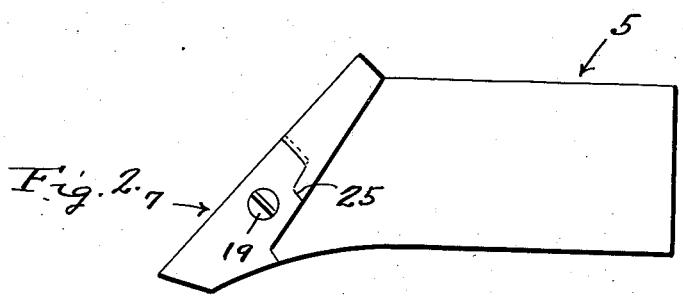
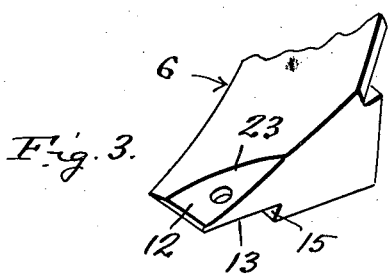
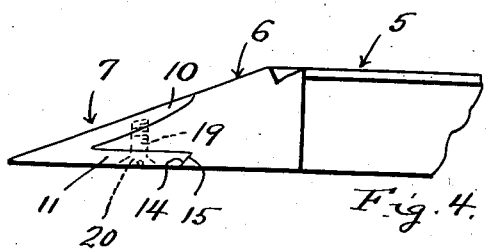
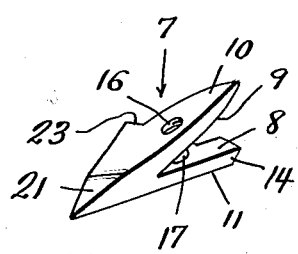
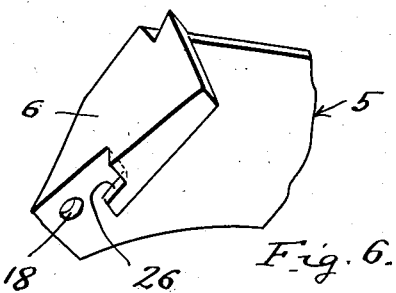
Inventor
Thomas W. Howard
Alvin E. Hagan
By Clarence A. O'Brien
Hyman Berman
Attorneys Patented Dec. 1, 1936

2,062,811

UNITED STATES PATENT OFFICE 2,062,811

PLOWSHARE WITH DETACHABLE POINT

Thomas W. Howard and Alvin E. Hagan, Hannibal, Mo.

Application July 30, 1936, Serial No. 93,486

1 Claim. (Cl 97—125)

Our invention relates generally to plow shares, and particularly to a plow share having a detachable point, and an important object of the invention is to provide a plow share of this character which has a removable point which may be replaced when worn or broken without removing the plow from the furrow.

Other important objects of our invention will be apparent from a reading of the following description taken in connection with the drawing wherein for purposes of illustration we have shown a preferred embodiment of our invention.

In the drawing:—

Figure 1 is a general side elevational view of the plow share of the present invention.

Figure 2 is an elevational view of the opposite side of the plow share.

Figure 3 is a perspective view.

Figure 4 is a bottom plan view.

Figure 5 is a perspective view of the removable point.

Figure 6 is a perspective view showing the point removed.

Referring in detail to the drawing, the numeral 5 generally designates a conventional form of plow share which includes the land side which is generally designated 6 and which is conventional in general outline and is of usual form except for the detachable point which is generally designated 7.

The point which is generally designated 7 is of the usual form of a plow share point except that it is formed in its wide end with a V-shaped cut which defines the plane upper surface 8 and the curved undersurface 9 and arms 10 and 11, respectively. The arm 10 is generally triangular in plan and triangular in cross section, and a conforming seat 12 is provided in the bottom of the land side 6 as particularly well illustrated in Figure 3 which conformably receives the arm 10 with the under surface 9 conformably engaged with the seat 12.

The arm 11 is substantially elongated rectangular in form and plan and a conformably shaped seat 13 is formed in the top of the land side. The rear extremity of the arm 11 is beveled as indicated by the numeral 14 to meet a conformably beveled shoulder 15 on the land side.

The arm 10 has a threaded opening 16 therein which is registered with an unthreaded opening 17 in the arm 11, and these openings are registered with the opening 18 in the plow share when the point 7 is in place thereon; and the assembling screw or bolt 19 traverses these various openings and threads into the opening 16 so as to rigidly but removably assemble the point 7 to the plow share. A countersink accommodates the screw head 20 in the arm 11. The exterior, that is, the top and bottom and side surfaces of the point merge conformingly into the corresponding surfaces of the land side and share. The extremity of the point has the usual beveled surface 21 at its extremity. Removal and replacement of the point 7 is effected simply by removing the screw or bolt 19 with a screw-driver without removing the plow share from the row, installing the new point, and replacing the screw.

As shown in Figure 1 the hypotenuse side of the triangular arm 10 is curved to conform to the curved edge 22 on the share and that at the end of the curved edge 22 is the shoulder 23 arranged to engage the shoulder 24 on the share. Another shoulder 25 on the opposite side of the point 7 engages a shoulder 26 on the land side, the engagement of the various surfaces and shoulders insuring rigid mounting of the point on the plow share.

Although we have shown and described herein a preferred embodiment of our invention, it is to be definitely understood that we do not desire to limit the application of the invention thereto, and any change or changes may be made in the materials, and in the structure and arrangement of the parts, within the spirit of the invention and the scope of the subjoined claim.

What is claimed is:—

A plow share construction comprising a share including a land side, a detachable point on said land side, said land side including a triangular projection having shoulders on opposite lateral sides thereof, and said point having a V-shaped notch bounded by shoulders for engaging with said shoulders and with said point, and bolt means traversing the arms defined by said notch, and said triangular projection and fastening the point on the plow share.

THOMAS W. HOWARD.
ALVIN E. HAGAN.